Sept. 18, 1945. B. H. CANADY 2,384,795
AUXILIARY SPRING MOUNTING
Filed Aug. 23, 1943 2 Sheets-Sheet 1
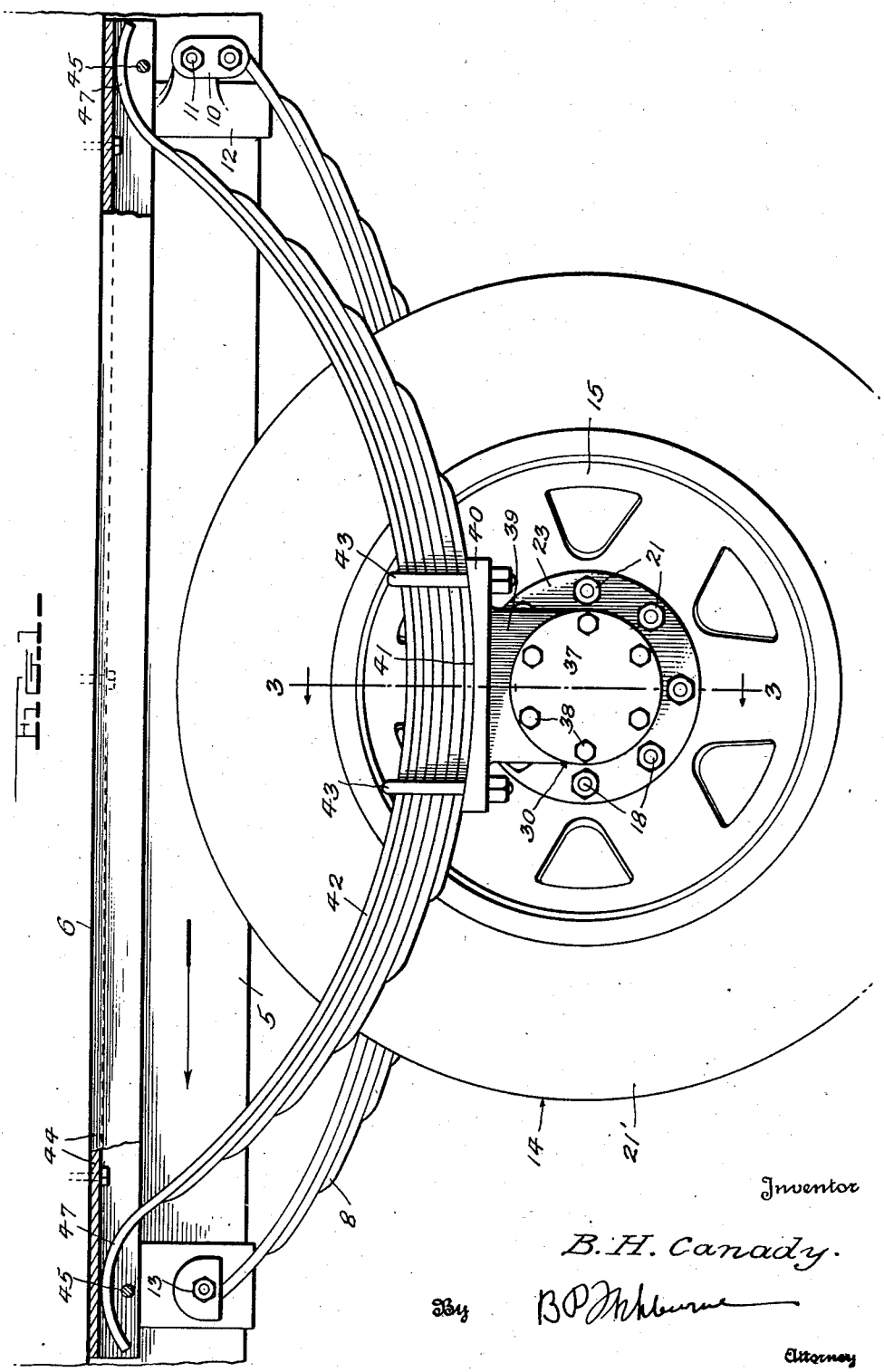
Inventor
B. H. Canady.
By
Attorney Sept. 18, 1945.            B. H. CANADY              2,384,795
                       AUXILIARY SPRING MOUNTING
                    Filed Aug. 23, 1943        2 Sheets-Sheet 2
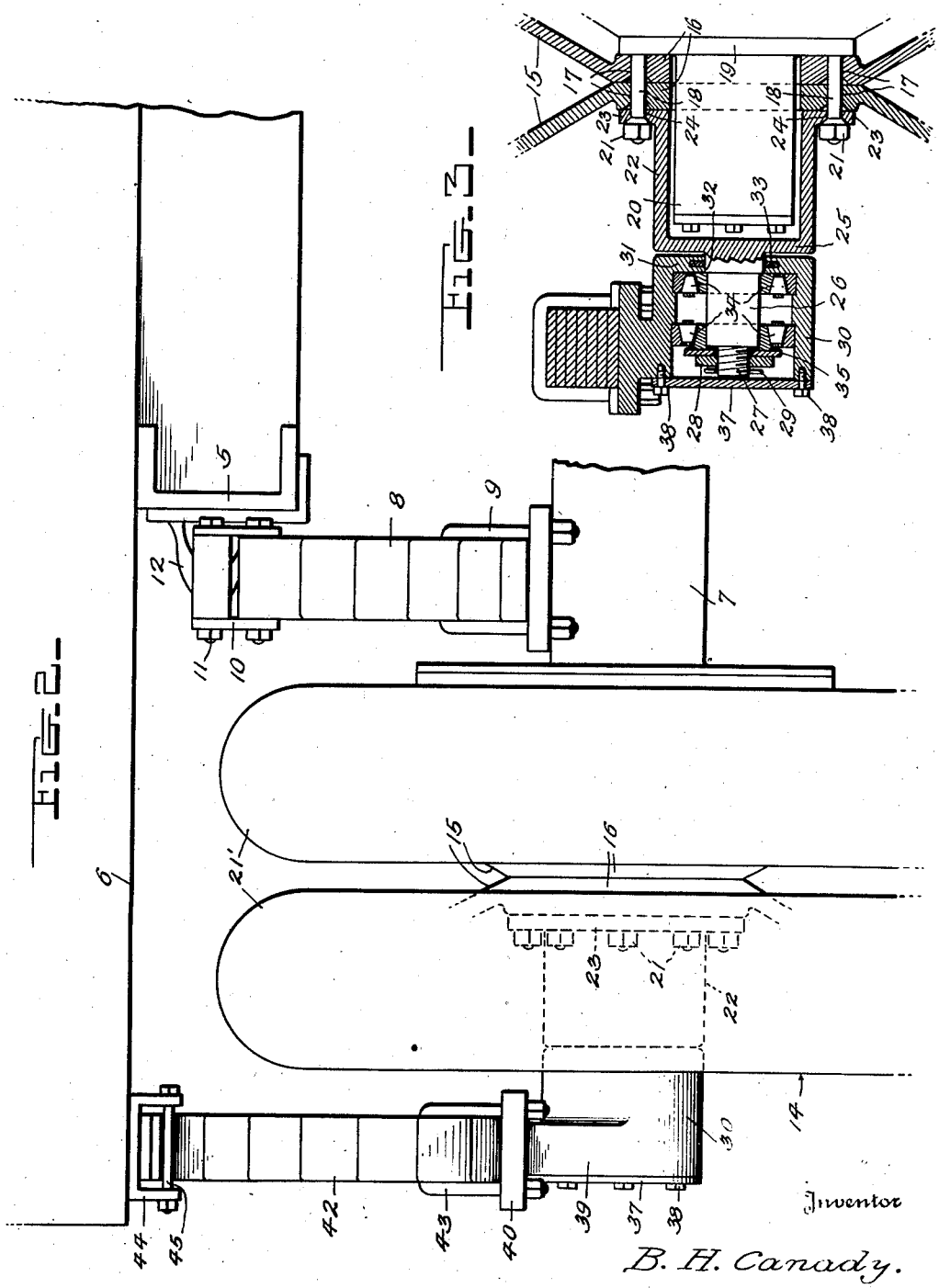

Patented Sept. 18, 1945

2,384,795

UNITED STATES PATENT OFFICE 2,384,795

AUXILIARY SPRING MOUNTING

Buel H. Canady, Huntington Park, Calif., assignor of one-half to Clifford J. Wiley, Winslow, Ariz.

Application August 23, 1943, Serial No. 499,669

4 Claims. (Cl. 267—36)

My invention relates to a spring mounting for power driven vehicles, such as trucks, trailers, buses or the like.

An important object of the invention is to provide an auxiliary outside spring mounting for use in connection with a power driven vehicle equipped with the usual inside spring mounting.

A further object of the invention is to provide spring mountings upon the inner and outer sides of the wheel unit, having two bearings for the spring mountings.

A further object of the invention is to provide spring mountings upon the inner and outer sides of the wheel unit thus reducing the liability of springing the rear axle or rear axle housing as the weight would be properly balanced upon the opposite sides of the wheel unit.

A further object of the invention is to provide a device of the above mentioned character which will afford protection to vehicles having a relatively high center of gravity for preventing them from turning over.

A further object of the invention is to provide means for connecting the outer auxiliary spring mounting with the chassis to prevent improper separation of the same but which will permit of the spring mounting being swung outwardly sufficiently to provide a passage for the change of tire or tires.

A further object of the invention is to provide an outer spring mounting which may be attached to the hub of the wheel without materially altering the construction of the same.

A further object of the invention is to provide an auxiliary spring mounting of the above mentioned character having a cap or coupling member to cover the hub of the wheel unit and secured to the hub by the same bolts which attach the wheel unit to the hub.

A further object of the invention is to provide a housing which is attached to the auxiliary spring and which is equipped with bearings to receive the spindle and will also properly retain the grease within the housing.

Other objects and advantages of the invention will be apparent during the course of the following description.

In the accompanying drawings forming a part of this application and in which like numerals are employed to designate like parts throughout the same.

Figure 1 is a side elevation of my outer auxiliary spring mounting, showing the same in use, Figure 2 is a rear end elevation of the same, and Figure 3 is a transverse section taken on line 3—3 of Figure 1.

In the drawings, wherein for the purpose of illustration is shown a preferred embodiment of my invention, the numeral 5 designates a longitudinal I-beam, forming each side of the chassis of a truck, trailer, bus or the like. Rigidly mounted upon the chassis 5 is a bottom 6 of the truck body, projecting laterally outwardly beyond each I-beam 5. Near the rear end of the chassis is the usual rear axle housing 7, serving to support the rear end of the chassis by leaf springs 8. A leaf spring 8 is arranged adjacent to each outer end of the rear axle housing 7, and the intermediate portion of this leaf spring is clamped to the axle housing by means including U-bolts 9. The rear end of each leaf spring 8 is pivotally connected with a shackle 10, and this shackle is pivoted at 11 with a bracket 12, rigidly secured to the I-beam 5. The forward end of the leaf spring 8 is secured to a fixed pivot or bolt 13, rigidly attached to the I-beam 5.

Arranged at each outer end of the axle housing 7 is a wheel unit 14, illustrated as a dual wheel, including disk wheels 15, having inner annular portions 16. These inner annular portions have openings 17 to receive bolts 18, rigidly secured to a flange 19 of a hub 20. The hub is secured to the rear axle spindle to be driven thereby. The bolts 18 carry nuts 21, which serve to retain the annular portions 16 clamped to the flange 19. The disk wheels are equipped with tires 21', as is well known. The wheel unit may consist of a single wheel or two or more wheels. The foregoing description is that of the conventional truck, trailer or bus.

My outer auxiliary spring mounting comprises a tubular cap or coupling 22, for receiving the hub 20 and provided at its inner end with an annular flange 23. This annular flange is adapted to engage with the outer annular portion 16 and has openings 24 to receive the bolts 18. Preferably formed integral with the outer closed end or head 25 of the cap 22 is a spindle 26, provided at its outer end with a reduced screw threaded extension 27 to receive a nut 28 and having a transverse opening to receive cotter pin 29.

The numeral 30 designates a housing, which is preferably cylindrical and provided at its inner end with a head 31, while its outer end is formed open. The head 31 has an opening 32, for the passage of the spindle 26 and this head is preferably equipped with packing 33, to prevent the escape of grease or the like. Suitably mounted within the housing 30 are bearings 34, which are preferably roller bearings, although they may be ball bearings. These bearings receive the spindle 26, as shown. After the spindle 26 has been passed into the bearings 34, a washer 35 is applied to the outer bearings 34, and the nut 28 is then applied to the screw threaded portion 27 and screwed up to engage the washer. The cotter pin 29 may then be passed through the opening in the screw threaded portion 27 to prevent unscrewing of the nut. As stated, the outer end of the housing 30 is formed open and I provide a cover 37 for this open end and this cover is secured to the housing 30 by bolts 38 or the like. It is obvious that grease or other lubricant introduced into the housing 30 will be retained therein. The housing 30 cannot move perceptibly upon the spindle 26 when the nut 28 is properly screwed up.

Preferably formed integral with the upper portion of the housing 30 is a vertical web 39, disposed adjacent to the outer end of the housing 30. This vertical web is provided with a horizontal web 40, extending at its ends beyond the web 39. The web 40 has an upper curved face 41, to engage with the intermediate portion of an outer auxiliary leaf spring 42. This leaf spring is secured to the web 40 by U-bolts 43.

Arranged above the leaf spring 42 is a channel iron 44, rigidly attached to the bottom 6 adjacent to its outer side and rear end. This channel iron is provided with horizontal bolts 45, spaced from the top of the channel iron. The uppermost leaf of the leaf spring 42 preferably has curved ends 47, which extend into the channel iron 44 above the bolts 45, and are spaced from these bolts when the ends 47 have the top of the channel iron 44 resting upon the same. The bolts 45 prevent the ends 47 separating from the channel iron 44 when the leaf spring 42 moves downwardly with relation to the channel iron, and the space or clearance betwen the ends 47 and bolts 45, is sufficient, to permit of the outer spring mounting being swung outwardly, within limits, to provide a passage for the changing of tire or tires.

It is thus seen that the outer auxiliary spring mounting is used in connection with the inner spring mounting, thus supporting spring mountings upon opposite sides of the wheel unit. This provides two bearings for the spring mountings and the weight is properly balanced upon opposite sides of the wheel unit, thereby reducing the liability of springing the rear axle or rear axle housing. The arrangement will also protect vehicles having a high center of gravity against turning over.

Having thus described my invention, what I claim is:

1. In a vehicle, a chassis, a rear axle housing beneath the chassis, a hub rotatably mounted upon each end of the rear axle housing and provided near its inner end with a radial flange, a disk wheel having a central opening for the passage of the hub and arranged upon the hub outwardly of the flange, the disk wheel having inner openings near its central opening, bolts carried by the flange and passing through the inner openings, a tubular cap having its outer end closed and its inner end open and provided near its inner end with a radial flange having openings, the tubular cap receiving the hub and the openings in the cap flange receiving the bolts, a spindle secured to the outer closed end of the cap and extending axially thereof, a housing receiving the spindle, a bearing within the housing and engaging the spindle, an auxiliary leaf spring disposed near and upon the outer side of the disk wheel and having its intermediate portion mounted upon the housing, the auxiliary leaf spring having an uppermost leaf provided with end portions having down-turned ends, retaining means receiving the end portions of the uppermost leaf, bolts secured to the retaining means and arranged beneath the end portions of the uppermost leaf and spaced therefrom, means to mount the retaining means upon the chassis, a main leaf spring disposed near and upon the inner side of the disk wheel and having its intermediate portion mounted upon the axle housing, means to pivotally connect one end of the main leaf spring with the chassis, a shackle having pivotal connection with the other end of the main leaf spring, and means to pivotally mount the shackle upon the chassis.

2. In a vehicle, a chassis, a rear axle housing beneath the chassis, a hub rotatably mounted upon each end of the rear axle housing and provided near its inner end with an outer radial flange, a disk wheel having a central opening for the passage of the hub and arranged upon the hub outwardly of the flange, the disk wheel having inner openings near its central opening, bolts carried by the flange and passing through the inner openings, a tubular cap having its outer end closed and its inner end open and provided near its inner end with an outer radial flange having openings, the tubular cap receiving the hub and the openings in the cap flange receiving the bolts, a spindle secured to the outer end of the cap and extending axially thereof, a housing to receive the spindle, a bearing within the housing and engaging the spindle, an auxiliary leaf spring disposed near and upon the outer side of the disk wheel and having its intermediate portion mounted upon the housing, means forming a loose connection between the ends of the auxiliary leaf spring and the chassis so that the auxiliary leaf spring may be swung laterally and outwardly while its ends are secured to the chassis, a main leaf spring disposed near and upon the inner side of the disk wheel and having its intermediate portion mounted upon the axle housing, and means to secure the ends of the main leaf spring to the chassis.

3. The combination with a hub provided near its inner end with an outer radial flange, a disk wheel having a central opening for the passage of the hub and arranged upon the hub outwardly of the flange, the disk wheel having inner openings near its central opening, bolts carried by the flange and passing through the inner openings, a tubular cap having its outer end closed and its inner end open and provided near its inner end with an outer radial flange having openings, the tubular cap receiving the hub and the openings in the cap flange receiving the bolts, a spindle secured to the outer end of the cap and extending axially thereof, a housing receiving the spindle, a bearing within the housing and engaging the spindle, a leaf spring disposed near and upon the outer side of the disk wheel and having its intermediate portion mounted upon the housing, and means for securing the ends of the leaf spring to the chassis of the vehicle.

4. The combination with a hub provided near its inner end with an outer radial flange, a disc wheel having a central opening for the passage of the hub and arranged upon the hub outwardly of the flange, the disc wheel having inner openings near its central opening, bolts carried by the flange and passing through the inner openings, a tubular cap having its inner end open and provided near its inner end with an outer radial flange having openings, the tubular cap receiving the hub and the openings in the cap flange receiving the bolts, the tubular cap having a head at its outer end, said head being disposed axially outwardly of the outer end of the hub, a spindle disposed upon the outer side of said head and secured to such head and having a smaller diameter than the tubular cap, said spindle extending axially of the tubular cap, a housing receiving the spindle and provided at its inner end with a head having a reduced opening for the passage of the spindle, a bearing arranged within the housing and mounted upon the spindle, and a spring disposed near and upon the outer side of the disc wheel and mounted upon the housing, said spring serving to support the vehicle.

BUEL H. CANADY.